United States Patent [19]
Holt

[11] Patent Number: 5,195,680
[45] Date of Patent: Mar. 23, 1993

[54] COAXIAL PAINT HOSE AND SUPPLY SYSTEM

[75] Inventor: Earl R. Holt, Rochester, Mich.

[73] Assignee: Hose Specialties/Capri, Inc., Highland Park, Mich.

[21] Appl. No.: 616,326

[22] Filed: Nov. 21, 1990

Related U.S. Application Data

[63] Continuation-in-part of Ser. No. 237,838, Aug. 29, 1988, Pat. No. 5,060,861.

[51] Int. Cl.$^5$ .............................................. F16L 39/02
[52] U.S. Cl. .................................. 239/124; 285/155; 138/114; 138/125; 138/137; 138/141
[58] Field of Search .............. 138/111, 113, 114, 125, 138/137, 141; 141/45; 239/112, 113, 119, 124, 125, 126, 127

[56] References Cited

U.S. PATENT DOCUMENTS

| | | | |
|---|---|---|---|
| 993,507 | 5/1911 | Collins | 285/133.1 |
| 2,031,849 | 2/1936 | O'Leary | 285/155 |
| 2,645,524 | 7/1953 | Kelly | 239/112 |
| 2,663,325 | 12/1953 | Bede | 239/127 |
| 3,062,241 | 11/1962 | Brumbach | 138/137 |
| 3,116,760 | 1/1964 | Matthews | 138/125 |
| 3,233,024 | 2/1966 | Jackson et al. | 138/137 |
| 3,251,381 | 5/1966 | Koch | 138/125 |
| 3,266,527 | 8/1966 | Ross | 138/125 |
| 3,529,626 | 9/1970 | German | 239/124 |
| 3,540,486 | 10/1970 | Flounders | 138/125 |
| 3,828,112 | 8/1974 | Johansen et al. | 138/127 |
| 4,007,070 | 2/1977 | Busdiecker | 138/141 |
| 4,106,699 | 8/1978 | Holt | 239/124 |
| 4,209,042 | 6/1980 | Buan | 138/126 |
| 4,303,457 | 12/1981 | Johansen et al. | 138/125 |
| 4,367,769 | 1/1983 | Bain | 285/155 |
| 4,732,414 | 3/1988 | Inaba | 285/133.1 |
| 4,754,782 | 7/1988 | Grantham | 285/133.1 |
| 4,791,965 | 12/1988 | Wynn | 138/137 |

FOREIGN PATENT DOCUMENTS

| | | | |
|---|---|---|---|
| 0883190 | 10/1971 | Canada | 285/133.1 |
| 2820465 | 11/1978 | Fed. Rep. of Germany | 138/125 |

Primary Examiner—Andres Kashnikow
Assistant Examiner—Christopher G. Trainor
Attorney, Agent, or Firm—Harness, Dickey & Pierce

[57] ABSTRACT

A flexible coaxial conduit in a recirculating paint supply system disposed between a flow control restrictor connected to a paint spray nozzle and a pressurized paint supply line and return line for supplying paint to the nozzle in a quantity in excess of that required to insure continued recirculation and uniformity in the composition and quality of the liquid coating composition. The coaxial conduit is substantially transparent and in the preferred embodiments, the outer tube is of a composite construction to provide optimum flexibility while retaining resistivity to the attack from the liquid paint composition and from solvents.

17 Claims, 3 Drawing Sheets

5,195,680

COAXIAL PAINT HOSE AND SUPPLY SYSTEM

CROSS-REFERENCE TO RELATED APPLICATION

This patent application is a continuation-in-part of U.S application Ser. No. 237,838, filed Aug. 29, 1988, now U.S. Pat. No. 5,060,861.

BACKGROUND OF THE INVENTION

The present invention broadly relates to recirculating-type liquid coating or paint supply systems of the types in widespread commercial use for keeping heavily-bodied pigments suspended in the liquid coating composition thereby promoting uniformity in the quality and color of the paint film applied to a substrate. Recirculating paint supply systems conventionally comprise a mixing tank equipped with suitable agitation for maintaining the liquid composition uniformly mixed and a pump for transferring the liquid coating composition under a desired pressure to an automatic or manual spray nozzle. A suitable return line of a reduced pressure is provided for returning the excess quantity of paint back to the mixing tank for recirculation. A flow control or restrictor device is conventionally employed at the inlet of the spray nozzle or spray gun which is adjustable so as to control the actual quantity of liquid coating composition for discharge through the spray nozzle.

In large commercial installation, such as in spray booths of the type employed for painting automobile bodies and the like, each spray booth or station is generally equipped with a plurality of individual paint supply systems of different color and/or type. Typically, twelve or more individual colored paint supply systems are installed ar each spray station to achieve the required flexibility. It will be appreciated that each system includes a pressure supply line and a return line such that in a station equipped with twelve separate systems, a total of twenty-four conduits or tubes are required which makes the spray station somewhat cumbersome from an operating standpoint. The supply tubes are normally about 15 to 20 feet in length and are of flexible structure extending between the main supply header and main return header to the spray nozzle.

PRIOR ART

U.S. Pat. No. 2,619,163 to Wynne et al. discloses a coaxial supply and return system for supplying fuel to a burner system. U.S. Pat. No. 2,645,524 has a coaxial supply system for delivering heated asphalt and solvent to a spray nozzle. U.S. Pat. No. 2,663,325 shows a paint supply system with a flexible spit tube having a divider along its length to provide more than one flow passage in the tube. U.S. Pat. No. 3,529,626 to German has a coaxial paint supply system for a recirculating paint system where the inner passage is the supply line and the outer passage is the return line.

The present invention overcomes many of the problems and disadvantages associated with prior art dual supply and return systems by providing a coaxial paint supply system achieving improved flexibility and at the same time substantially reducing the number and physical size of the supply and return system thereby providing for increased efficiency and ease of application of coating systems to substrates while improving the housekeeping environment of a multiple coating composition spray station.

SUMMARY OF THE INVENTION

The benefits and advantages of the present invention are obtained in a recirculating paint supply system that has a flexible coaxial conduit connected between the flow control device on a spray nozzle and the supply and return conduits of a recirculating paint supply system. The coaxial conduit comprises an outer flexible tube adapted to be connected at one end thereof to a coupling disposes in communication with the pressurized liquid paint supply conduit and at the other end thereof to a flow restrictor disposed in communication with a spray nozzle. An inner tube having a first end connected to the main return conduit extends axially within the outer tube and terminated at a second end thereof disposed at a position axially spaced from the flow control restrictor and disposed with the second end in communication with the interior of the outer tube for receiving and returning the excess liquid paint supplied to the nozzle. The coupling includes a branch conduit for introducing the inner tube in liquid sealed relationship from a position exterior of the outer tube to a position in axial extending relationship within the outer tube.

In accordance with a preferred embodiment of the present invention particularly applicable for the manual spray application of liquid coating composition, the outer tube is of a composite construction comprising an outer layer of a strong flexible and transparent material and an inner layer of a material which is resistant to attack of the liquid coating composition passing therethrough.

In accordance with an alternative preferred embodiment of the present invention, a coaxial conduit is disclosed having a composite outer tubing and an inner tubing disposed coaxially within the composite outer tubing. The composite outer tubing includes a inner layer which is generally impervious to liquids such as paint, an intermediate layer which is highly flexible, and an outer layer which is also of a material substantially impervious to liquids such as paint, and also highly resistant to structural degradation caused by solvents which come in contact with its outer surface. The composite outer tubing enables the coaxial conduit to be flexed and articulated easily during use while remaining resistant to structural degradation.

Additional benefits and advantages of the present invention will become apparent upon a reading of the description of the preferred embodiments taken in conjunction with the accompanying drawings.

BRIEF DESCRIPTION OF THE DRAWINGS

FIG. 5 is a cross-sectional view through the coaxial conduit of the alternative preferred embodiment of the present invention showing most clearly the inner, intermediate and outer layers of the outer tubing and the internally, coaxially disposed inner tubing.

DESCRIPTION OF THE PREFERRED EMBODIMENTS

Figure 1:
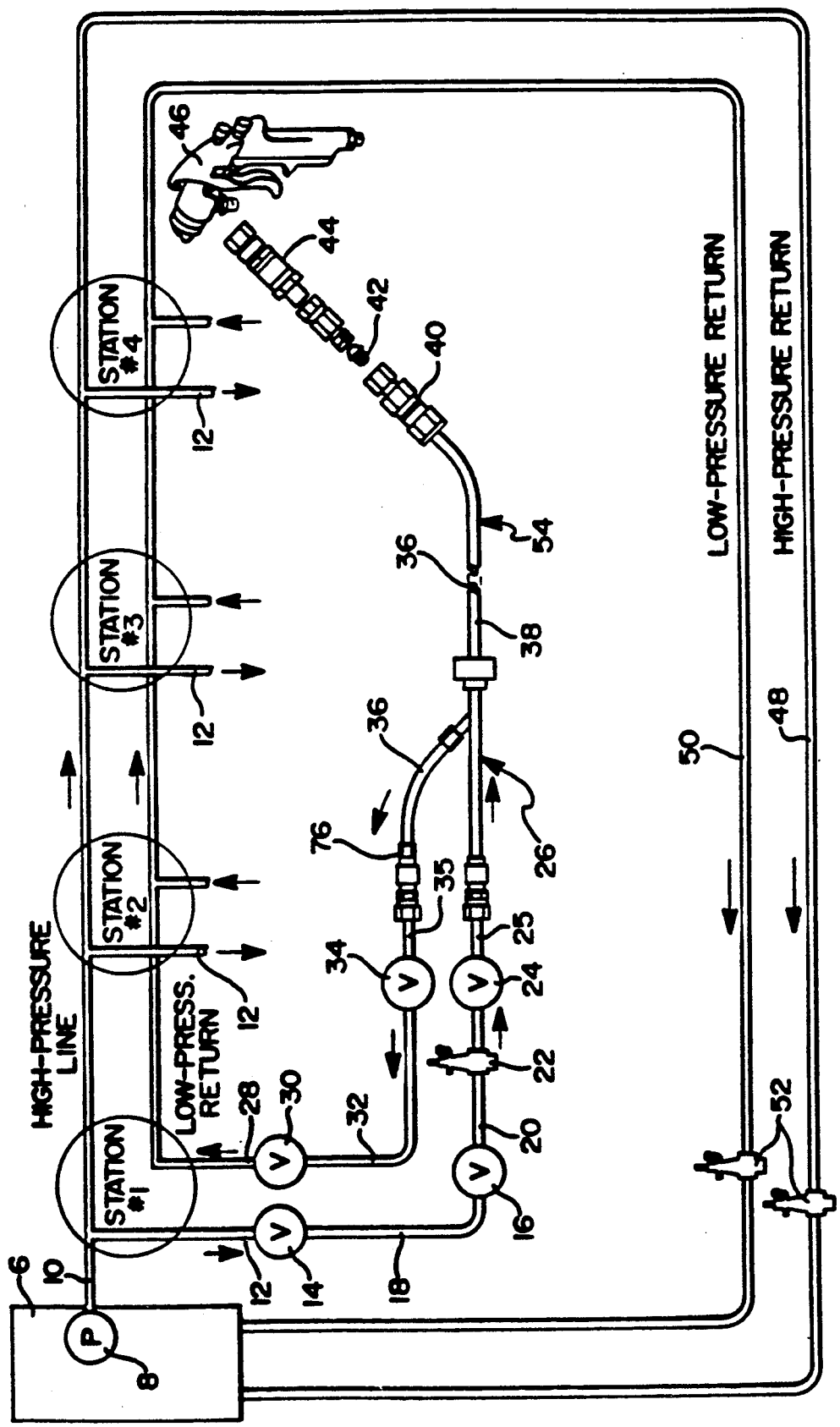
FIG. 1 is a schematic, partly exploded view of a multiple spray station arrangement of a recirculating liquid paint coating composition supply system embodying the invention.

Referring now in detail to the drawings, and as may best be seen in FIG. 1, a multiple station recirculating paint supply system is illustrated comprising four separate stations each provided with a pressurized liquid coating or paint supply line and a return line. It will be appreciated, that the system as illustrated in FIG. 1 is duplicated numerous times to provide for a plurality of different coating compositions and/or different colors such that each spray station may include, for example, twelve different systems to supply twelve different colors of the desired coating composition. The systems illustrated in FIG. 1 illustrates a single recirculating paint supply of a specific color for spray station No. 1 and typically includes a supply tank 6 in the mixing room which is equipped with suitable agitation (not shown) and a supply pump 8 for supplying the liquid coating composition under high pressure to a main supply header 10. A branch line 12 at each spray station is connected to the supply header and in turn is connected to a main shutoff valve 14 at the spray station entry which in turn is connected to a second valve 16 by means of a conduit 18 which in turn is connected to a third conduit 20 to a fluid pressure regulator 22 and then to a third valve 24 adapted to be connected by conduit 25 to a Y-shaped coupling 26 of the present invention. As noted in FIG. 1, each spray station has a return header 28 provided with a valve 30 which is connected by means of a conduit 32 to a second shutoff valve 34. The second shutoff valve 34 is connected by conduit and coupling 35 to one end of an inner tube 36 of the Y-shaped coupling 26 which extends axially and inwardly in a manner more fully illustrated in FIG. 3 within an outer tube 38 defining the coaxial supply system of the present invention.

As illustrated in FIG. 1, the outer tube 38 is connected by a suitable coupling in fluid tight relationship to a flow control or fluid restrictor 40 of a type as illustrated in U.S. Pat. No. 4,106,699 of the present inventor, granted Aug. 15, 1978, the teachings of which are incorporated herein by reference. In the specific arrangement illustrated in FIG. 1, the system further preferably includes a filter element 42 disposed in line with the fluid restrictor which in turn is connected to a quick disconnect coupling 44 adapted to be attached to a conventional air atomized spray nozzle or gun 46.

The quantity of paint supplied through the main supply header 10 is in excess of that required at the multiple spray stations and the balance thereof is returned to the supply tank 6 in the mix room through a high pressure return line 48. The liquid coating composition returned to the recirculating system at each of the spray stations enters a low pressure return line 50 which also is in communication with the supply tank 6 in the mix room. Both the high pressure return line 48 and low pressure return line 50 are suitably equipped with back-pressure regulators 52.

In accordance with the foregoing arrangement, a continuous supply of substantially uniformly mixed liquid coating composition or paint is supplied to each spray station in a quantity of excess of that required and a portion of the excess paint is continuously returned at each spray station to the low pressure return line 50 which in combination with that from the high pressure return line 48 is recirculated to the supply tank for remixing and reblending and for recirculation back through the system.

Figure 2:
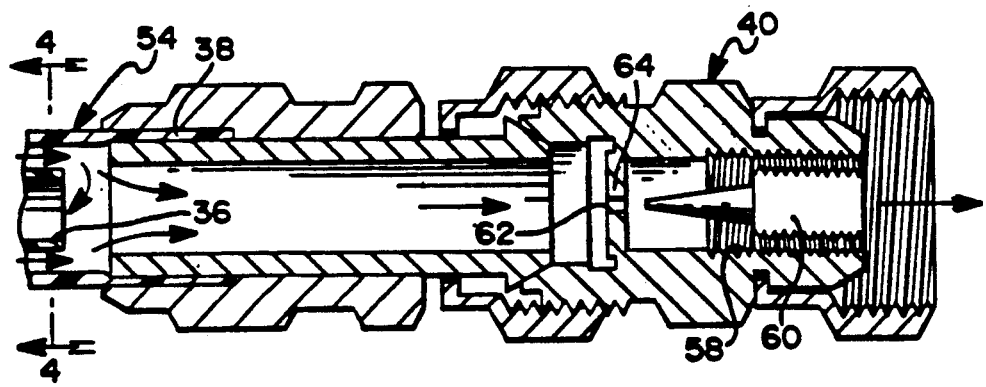
FIG. 2 is a fragmentary enlarged sectional view of one end of the coaxial conduit connected to the flow control restrictor attached to the paint spray nozzle.
Figure 3:
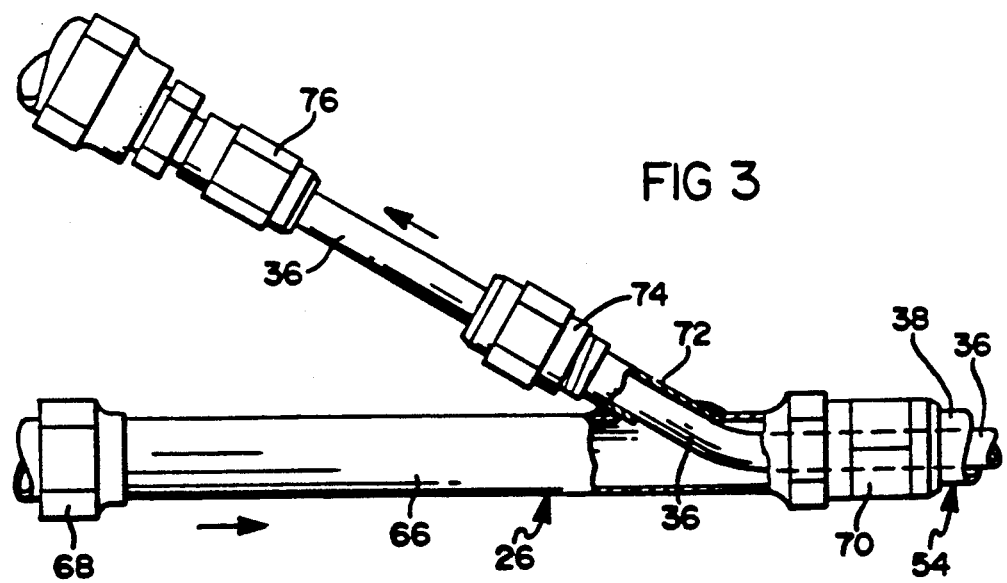
FIG. 3 is a fragmentary enlarged elevational view partly in section of the coupling for introducing the inner tube in axially extending relationship within the outer tube.

As shown in FIG. 1, the coupling 26 is connected by means of a coaxial conduit 54 to the fluid restrictor 40 in a manner that is more clearly shown in FIGS. 2 and 3 of the drawings. The fluid restrictor is of an axial type including a threaded inner bore 58 in which a flow control meter valve 60 is threadably secured having a tapered end portion which is disposed in axial flow restricting relationship and in axial alignment relative to an aperture 62 in an orifice plate 64 disposed in the inlet side of the fluid restrictor. Axial adjustment of the meter valve 60 controls the quantity of liquid coating composition to be supplied to the spray nozzle. The meter valve 60 is generally of a square or rectangular cross-section so as to permit fluid flow axially along the flat sides of the meter valve in all of its adjusted positions.

The opposite end of the coaxial supply conduit 54 is connected as shown in FIG. 3 to the coupling 26 comprising a tubular member 66 formed with a coupling 68 at the inlet end thereof for connecting the coupling to the conduit 25 and a third valve 24 (FIG. 1) and a tube connector 70 at the other end thereof for connecting the outer tube 38 in fluid tight relationship to the tubular member 66. The coupling 26 is further provided with an angular branch tube 72 through which the inner tube 36 extends and is sealed by means of a threaded seal 74 to the outlet end thereof. The inner tube 36 is connected to a suitable fluid tight threaded coupling 76 at its outer end for connecting the inner tube 36 in liquid tight relationship to the conduit 35 and second shutoff valve 34 (FIG. 1).

The Y-shaped coupling 26 in accordance with the arrangement illustrated in FIG. 3 provides for a fluid and pressure tight connection by which the inner tube 36 extends from a position exterior of the outer tube 38 to a position in axial extending relationship inside of and coaxial with the outer tube 38.

Figure 4:
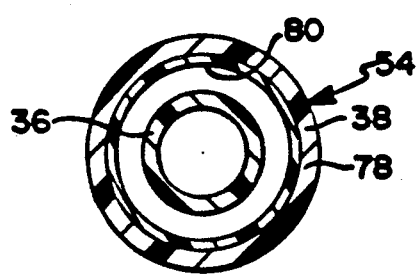
FIG. 4 is a transverse vertical sectional view through the coaxial conduit illustrating the composite construction of the outer tube as taken along the line 4—4 of FIG. 2.
Figure 3:
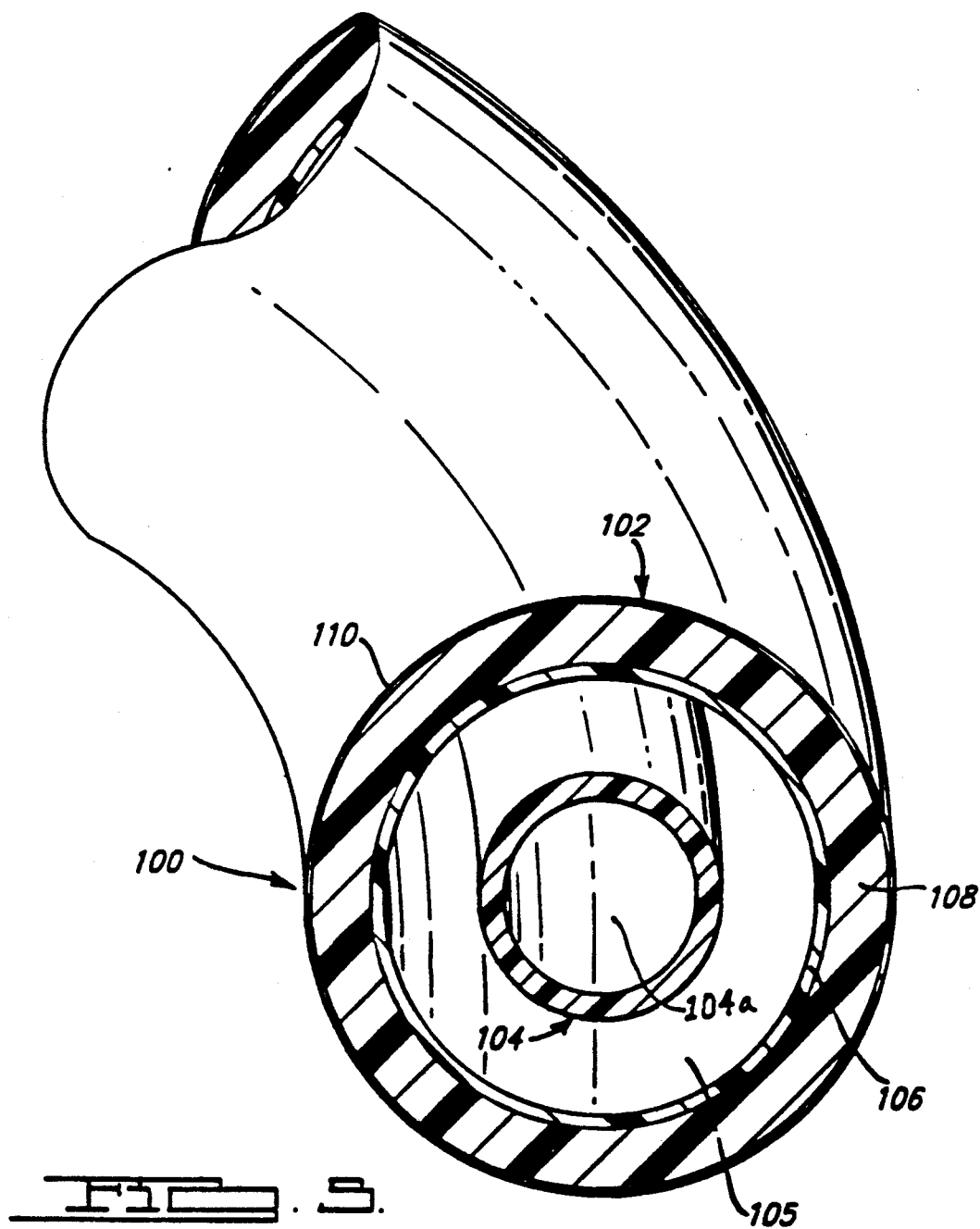

In accordance with a preferred embodiment of the present invention, and as shown in FIG. 4, the outer tube 38 is of a composite construction comprising an outer flexible layer 78 of high strength and high flexibility and an inner continuous layer 80 comprised of a material which is resistant to attack by the liquid coating compositions in contact therewith. The provision of such a composite construction of the outer tube 38 enables a higher attainment of flexibility of the coaxial conduit in comparison with the use of a unitary construction. Particularly satisfactory results are attained when the outer flexible layer 78 is comprised of a mixture of nylon and polyurethane plastics achieving high strength, transparency and good flexibility. The inner layer may comprise nylon which has been found particularly resistant to attack from coating compositions of the general types known in the art. Similarly, the inner tube 36 may be comprised of nylon in that both the exterior and interior surfaces thereof are disposed in contact with the liquid coating composition. The improved flexibility of the coaxial supply conduit is particularly desirable when the spray nozzle is manually manipulated by an operator.

Referring now to FIG. 5, there is shown a cross-sectional view of a coaxial conduit 100 in accordance with an alternative preferred embodiment of the present invention. This conduit 100 is substantially identical to the conduit 54 illustrated in FIGS. 1 and 4, with the exception of the construction of its outer tubing.

Coaxial conduit 100 generally comprises an outer, or first, tube 102 and an inner, or second, tube 104 disposed coaxially within the outer tube 102. The area inbetween the outer surface of the inner tube 104 and the inner surface of outer tube 102 defines a fluid supply path 105. The interior area of the inner tube 104 defines a fluid return path 104a. Both the fluid supply and fluid return paths 105 and 104a will be discussed momentarily in the following paragraphs.

The outer tube 102 is comprised of three independent, co-extruded layers of tubing; an inner, or first, layer 106; an intermediate, or second layer 108; and an outer, or third, layer 110. The inner layer 106 is preferably comprised of nylon having a cross-sectional thickness in the range of about 0.020–0.030 inch. The intermediate layer 108 is preferably comprised of urethane having a cross-sectional thickness in the range of about 0.059–0.060 inch. The outer layer 110 is preferably comprised of nylon and has a thickness in the range of about 0.005–0.010 inch. Accordingly, the overall cross-sectional thickness of the inner, intermediate and outer layers of tube 102 is preferably about 0.084–0.100 inch.

As mentioned previously, the inner 106, intermediate 108 and outer 110 layers of the outer tube 102 are co-extruded to produce an outer tube 102 having a unitary, composite construction which is highly flexible, impervious to liquids, and highly resilient to structural degradation, such as corrosion, caused by solvents.

Flexibility is important because the conduit 100 must be flexible enough to be easily articulated into various positions during use. At the same time, the inner layer 106 must be impervious to paint flowing through the fluid supply path 105. The outer layer 110 must be impervious to solids and other cleaning agents to prevent leakage and contamination of the paint flowing through fluid supply path 105. In particular, the outer layer 110 must be substantially impervious to cleaning agents, such as solvents, which may be used periodically to clean paint and other like liquids which come in contact with the outer surface of tube 102.

The inner tubing 104 is preferably comprised of nylon having a cross-sectional thickness preferably of 0.038 inch. The overall outer diameter of inner tubing 104 is preferably about 0.225 inch. The inner diameter of the outer tubing 102 is preferably about 0.375 inch. Accordingly, fluid supply path 105 has a preferable cross-sectional area of about 0.472 inch. It should be appreciated, however, that the inner and outer tubings 104 and 102 respectively of the coaxial conduit 100 could be made in a wide variety of diameters to accommodate a correspondingly wide variety of fluid supply and return flow rates.

Turning now to the operation of the coaxial conduit 100, the outer tube 102 is coupled in fluid communication with third valve 24 via Y-shaped coupling 26 and with fluid restrictor 40, in a manner identical to that shown in FIG. 1. The inner tubing 104 is also connected in fluid communication with second shut-off valve 34 via the Y-shaped coupling 26 and with fluid restrictor 40, as also illustrated best in FIGS. 1 and 2. Paint is supplied through third valve 24 and fluid supply path 105 to spray gun 46. Excess paint is returned through inner tubing 104 to supply tank 6.

It should also be appreciated hat the tubing sections of Y-shaped coupling 26 could readily incorporate the composite construction of coaxial conduit 100 if so desired or required by a particular application or environment. The composite construction of coaxial conduit 100, however, is particularly advantageous and desirable because conduit 100 is the portion of the paint supply system which is typically moved and articulated about most often during use.

While it will be apparent that the invention herein described is well calculated to achieve the benefits and advantages set forth above, it will be appreciated that the invention is susceptible to modification, variation and change without departing from the spirit and scope thereof.

What is claimed is:

1. For a paint supply system, a coaxial conduit adapted to be coupled in fluid communication inbetween a paint source and a paint spray gun for supplying paint from the paint spray source to the paint spray gun and for returning the paint not discharged by the paint spray gun back to the paint spray source, said coaxial conduit comprising:

a first section of tubing having inner and outer surfaces, said tubing being coupled in fluid communication inbetween said paint spray source and said paint spray gun, said first tubing having co-extruded inner, intermediate and outer layers forming a unitary, composite tubing wall, said inner layer including a nylon layer having a thickness in the range of about 0.020 to 0.030 inch, said intermediate layer including a urethane layer having a thickness in the range of about 0.059–0.060 inch, an l said outer tubing layer including a nylon layer having a thickness in the range of about 0.005–0.010 inch, said inner, intermediate and outer layers operating cooperatively to enable said first section of tubing to flex readily in response to movement and articulation thereof during use, said inner and outer layers of said first section of tubing being impervious to said paint operating to resist structural degradation in response to contact thereof with solvents;

a second section of tubing having inner and outer surfaces, said second section of tubing being in fluid communication with and coupled inbetween said paint supply source and said paint spray gun and disposed coaxially within said first section of tubing for enabling said paint which is not discharged by said spray gun to be returned therethrough to said paint supply source, said area defined by said inner surface of said first section of tubing and said outer surface of said second section of tubing forming a fluid supply path by which said paint may be supplied from said paint supply source to said paint spray gun; and a Y-shaped coupling member having paint supply and paint return tubing members and a coupling member in fluid communication with said paint supply and paint return tubing members, said paint supply tubing member being in fluid communication with said paint supply source and said paint return tubing member being in fluid communication with said paint supply source, said coupling member further being in independent fluid communication with said first tubing section to enable said first tubing section to receive said paint through said paint supply tubing member, said coupling member further being in independent fluid communication with said second tubing section to enable said paint flowing through said second section of tubing not discharged by said paint spray gun to be independently returned to said paint supply source through said paint return tubing member.

2. The coaxial conduit of claim 1, wherein said second section of tubing comprises an outer diameter of about 0.225 inch.

3. The coaxial conduit of claim 1, wherein said first section of tubing comprises an inner diameter of about 0.375 inch.

4. For a paint supply system, an apparatus for providing fluid communication between a paint supply source and a paint spray gun to thereby enable paint to be supplied from a paint supply source to said spray gun and excess paint not discharged from said paint spray gun to be returned from said paint spray gun to said paint supply source, said apparatus comprising:

first tubing means having inner and outer surfaces coupled inbetween said paint supply source and said paint spray gun for helping to define a fluid supply path through which paint may be supplied therethrough from said paint supply source to said paint supply gun, said first tubing means having a composite construction including an inner layer generally resistant to said paint, a flexible, intermediate layer susceptible to degradation by said paint for enabling said first tubing means to flex and be articulated more easily as said first conduit means is moved and articulated about, and an outer, layer generally resistant to degradation by paint solvents, said first, second and third layers thereby cooperating to enable said first tubing means to be easily flexed and articulated during use thereof and yet be resistant to structural degradation caused by paint solvents and said paint;

second tubing means having inner and outer surfaces disposed coaxially within said first tubing means, and intermediate and in fluid communication with said paint supply source and said paint spray gun for providing a return flow path to said paint supply source from said paint spray gun for said paint supplied to said paint spray gun through said first tubing means but not discharged by said paint spray gun, said outer surface of said second tubing means cooperating with said inner surface of said first tubing means to define an area representing said fluid supply path and a Y-shaped coupling member having paint supply and paint return tubing members and a coupling member in fluid communication with said paint supply and paint return tubing members, said paint supply tubing member being in fluid communication with said paint supply source and said paint return tubing member being in fluid communication with said paint supply source, said coupling member further being in independent fluid communication with said first tubing means to enable said first tubing means to receive said paint through said paint supply tubing member, said coupling member further being in independent fluid communication with said second tubing means to enable said paint flowing through said second tubing means not discharged by said paint spray gun to be independently returned to said paint supply source through said paint return tubing member.

5. The apparatus of claim 4, wherein said inner layer comprises an inner nylon tubing having a thickness in the range of about 0.020 to 0.030 inch.

6. The apparatus of claim 4, wherein said intermediate layer comprises a urethane tubing having a thickness of about 0.059–0.060 inch.

7. The apparatus of claim 4, wherein said outer, degradation-resistant layer comprises a nylon layer having a thickness of about 0.005–0.010 inch.

8. The apparatus of claim 4, wherein said inner, intermediate and outer, degradation-resistant layers are co-extruded to provide a unitary, composite, outer paint supply tube.

9. A tubing apparatus for providing independent fluid supply and fluid return paths between a fluid supply source and a fluid discharge mechanism, and tubing apparatus comprising:

first tubing means having inner and outer surfaces and coupled intermediate said fluid supply source and said discharge mechanism for supplying fluid supply source to said fluid discharge mechanism, said first tubing means being of a composite construction including a first layer resistant to attack by said paint, a degradable, flexible second layer and generally an impervious third layer, said composite construction enabling said first tubing means to flex readily as said first tubing means is moved and articulated, said composite construction of said first tubing means further assisting said first tubing means to resist structural degradation caused by contact with solvents;

second conduit means coupled intermediate said fluid supply source and said fluid discharge mechanism and disposed coaxially within said first conduit means, said second conduit means being operable to provide an independent return path therethrough from said fluid discharge mechanism to said fluid supply source for said fluid which is not discharged at said fluid discharge mechanism; and a Y-shaped coupling member having supply and return tubing members and a coupling member in fluid communication with said supply and return tubing members, said supply tubing member being in fluid communication with said fluid supply source and said return tubing member being in fluid communication with said fluid supply source, said coupling member further being in independent fluid communication with said first tubing means to enable said first tubing means to receive said fluid through said supply tubing member, said coupling member further being in independent fluid communication with said second tubing means to enable said fluid flowing through said second tubing means not discharged by said fluid discharge mechanism to be independently returned to said fluid supply through said return tubing member.

10. The apparatus of claim 9, wherein said first layer of said first tubing means comprises a nylon layer having a thickness of approximately 0.020 to 0.030 inch.

11. The apparatus of claim 9, wherein said second layer of said first tubing means comprises a urethane layer having a thickness of about 0.059–0.060 inch.

12. The apparatus of claim 9, wherein said third layer of said first tubing means comprises a nylon layer having a thickness of preferably about 0.005–0.010 inch.

13. An apparatus for providing fluid communication between a paint supply source and a paint spray gun in a paint supply system, the apparatus adapted to return from the spray gun to the supply source paint supplied to the spray gun but not discharged by the spray gun, the apparatus comprising:

first tubing means in fluid communication with the supply source and the spray gun for supplying paint from the supply source to the spray gun, said first tubing means having multiple tubing layers including an outermost layer impervious to corrosion by caustic fluids, an innermost layer impervious to corrosion by the paint and a flexible intermediate layer disposed between said outermost and innermost layers, said intermediate layer being susceptible to degradation by caustic fluids and the paint;

second tubing means in fluid communication with the supply source and the spray gun for returning paint from the spray gun to the supply, said second tubing means disposed substantially coaxially within said first tubing means; and a Y-shaped coupling member having paint supply and paint return tubing members and a coupling member in fluid communication with said paint supply and paint return tubing members, said paint supply tubing member being in fluid communication with said paint supply source and said paint return tubing member being in fluid communication with said paint supply, said coupling member further being in independent fluid communication with said first tubing means to enable said first tubing means to receive said paint through said paint supply tubing member, said coupling member further being in independent fluid communication with said second tubing means to enable said paint flowing through said second tubing means not discharged by said paint spray gun to be independently returned to said paint supply source through said paint return tubing member.

14. The apparatus of claim 13 wherein said innermost and outermost layers of said first tubing means are comprised of a semi-flexible impervious compound having thickness sufficient to protect said intermediate layer is said first tubing means from degradation while said thicknesses of said innermost and outermost layers are sufficiently thin to allow flexing of said first tubing means.

15. The apparatus of claim 14 wherein said innermost and outermost layers of said first tubing means are comprised of nylon having thicknesses substantially within the range of 0.059–0.060 inches and 0.005–0.010 inches, respectively.

16. The apparatus of claim 13 wherein the outer diameter of said first tubing means is approximately 0.375 inches.

17. The apparatus of claim 13 wherein the outer diameter of said second tubing means is approximately 0.225 inches.

* * * * *

UNITED STATES PATENT AND TRADEMARK OFFICE
CERTIFICATE OF CORRECTION

PATENT NO. : 5,195,680
DATED : March 23, 1993
INVENTOR(S) : Earl R. Holt

It is certified that error appears in the above-indentified patent and that said Letters Patent is hereby corrected as shown below:

On the Title Page, Under U.S. Patent Documents, reference "Flounders", "10/1970" should be --11/1970--.

Column 1, line 37, "ar" should be --at--.

Column 2, line 12, "disposes" should be --disposed--.

Column 6, line 3, "hat" should be --that--.

Column 7, line 27, Claim 4, "supply" should be --spray--.

Column 8, line18, Claim 9, "and" (second occurrence) should be --said--.

Column 10, line 14, Claim 14, "thickness" should be --thicknesses--.

Column 10, line 14, Claim 14, "is" should be --in--.

Signed and Sealed this

Twenty-third Day of August, 1994

Attest:

BRUCE LEHMAN

*Attesting Officer*  *Commissioner of Patents and Trademarks*